United States Patent
Breitbach

(10) Patent No.: US 7,404,132 B2
(45) Date of Patent: Jul. 22, 2008

(54) ARQ METHOD WITH ADAPTIVE TRANSMITTAL DATA BLOCK POSITIONS

(75) Inventor: Johannes Markus Breitbach, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 519 days.

(21) Appl. No.: 10/523,592

(22) PCT Filed: Jul. 10, 2003

(86) PCT No.: PCT/EP03/07519

§ 371 (c)(1),
(2), (4) Date: Feb. 4, 2005

(87) PCT Pub. No.: WO2004/015910

PCT Pub. Date: Feb. 19, 2004

(65) Prior Publication Data

US 2005/0262142 A1    Nov. 24, 2005

(30) Foreign Application Priority Data

Aug. 6, 2002    (DE) ............................... 102 36 006
Aug. 6, 2002    (EP) ................................. 02017543

(51) Int. Cl.
*H04L 1/18*    (2006.01)
(52) U.S. Cl. ................ 714/749; 714/780; 714/792; 375/265
(58) Field of Classification Search ......... 714/748–751, 714/780
See application file for complete search history.

(56) References Cited

U.S. PATENT DOCUMENTS

| 5,793,983 A | 8/1998 | Albert et al. |
| 6,208,663 B1 | 3/2001 | Schramm et al. |
| 6,247,150 B1 | 6/2001 | Niemela |

FOREIGN PATENT DOCUMENTS

| WO | 00/48052 | 8/2000 |
| WO | 02//067491 | 8/2002 |

OTHER PUBLICATIONS

Arvind R. Raghaavan et al., "A Reliability Output Viterbi Algorithm with Applications to Hybrid ARQ", IEEE Transactions on Information Therory, vol. 44, No. 3, May 1998, pp. 1214-1216.
J. M. Shea, "Reliability-based hybrid ARQ", Electronics Letters, vol. 38, No. 13, Jun. 20, 2002, pp. 644-645.

*Primary Examiner*—Guy J. Lamarre
(74) *Attorney, Agent, or Firm*—Staas & Halsey LLP

(57) ABSTRACT

In a communication system a transmission-end input data flow with serially successive data is transmitted via a time-variant transmission channel. The transmission-end input data flow is divided into individual words. An a-priori reliability value is determined for each position of a transmittal data block by transmission-end modulation methods and coding methods, and the words of the input data flow are associated with corresponding positions of the transmittal data block according to the a-priori reliability values, and transmitted. An a-posteriori reliability value is formed on the receiving end for each word of the transmittal data block. The words having an a-posteriori reliability value falling below a pre-determined minimum value are re-requested and re-transmitted by acknowledgement of the corresponding positions.

10 Claims, 5 Drawing Sheets

FIG 5

|  | Q1 |  |  | Q3 |
|---|---|---|---|---|
| X<br>0000<br>AP11 | X<br>0100<br>AP13 | X<br>1100<br>AP31 | X<br>1000<br>AP33 |
| X<br>0001<br>AP12 | X<br>0101<br>AP14 | X<br>1101<br>AP32 | X<br>1001<br>AP34 |
| X<br>0011<br>AP21 | X<br>0111<br>AP23 | X<br>1111<br>AP41 | X<br>1011<br>AP43 |
| X<br>0010<br>AP22 | X<br>0110<br>AP24 | X<br>1110<br>AP42 | X<br>1010<br>AP44 |
|  | Q2 |  |  | Q4 |

ARQ METHOD WITH ADAPTIVE TRANSMITTAL DATA BLOCK POSITIONS

CROSS REFERENCE TO RELATED APPLICATIONS

This application is based on and hereby claims priority to German Application No. 102 36 006.5 filed Aug. 6, 2002 and European Application No. 02017543.6 filed on Aug. 6, 2002, the contents of which are hereby incorporated by reference.

BACKGROUND OF THE INVENTION

1. Field of the Invention

The invention relates to a method for the transmission of data in a communication system, in which a transmittal data stream with serially successive data is transmitted via a time-variant transmission channel.

2. Description of the Related Art

If on the basis of the receiving-end checking data information, an errored data block was detected, the corresponding data block will be rejected in the case of the ARQ method and requested again at the transmission end.

With a hybrid ARQ method, the errored data block that was first transmitted is buffered and re-requested at the transmission end. The re-requested data block and the buffered data block are combined with one another in the receiver. The resulting data block is then checked again for errors using the checking procedure.

With the hybrid ARQ method the data block is re-transmitted in accordance with the pure ARQ method: The data block is re-transmitted unchanged and coded in the same way. A method known as "chase combining" is used as the combination method.

As an alternative, the block can be transmitted in accordance with the "incremental redundancy" method. Here the coding of the data block to be re-transmitted is changed. As a result, an additional redundancy method for error correction is made available at the receiver. The buffered data block and the re-transmitted data block are combined by a so-called "code combining" method.

In the case of radio communication systems, it is necessary to adapt a data transmission rate with a high data throughput optimally and dynamically to the properties of a radio transmission channel which, in general, change over time (time-variant) through statistical fluctuations and interferences within the radio transmission channel. However, in the case of an increased data transmission rate, the susceptibility of data transmission to errors also increases because the capacity limit of the radio transmission channel is being approached.

The problems resulting from time-variant radio transmission channels are, for example, well-known from the mobile radio standards GSM, UMTS, HiperLAN, etc. and are particularly marked for strong power fluctuations in a receive signal as well as by the noise that overlaps and interferes with this received signal caused by a receiving amplifier arranged at the receiving end.

The power fluctuations in this case depend on the location and movement of a mobile user.

Telephone lines for ADSL connections, cables for cable television and optical fiber cables can also be seen as time-variant transmission channels.

Data blocks to be transmitted are protected against transmission errors by redundancy methods, forwards error correction methods or by a special error detection coding method. As a result, in each case a proportion of useful data is reduced accordingly within a data block to be transmitted.

Therefore, while in the case of a transmission channel with poor transmission properties a large amount of redundancy data is required in a data block, it is known that for transmission channels with good transmission properties (with a typical bit error rate BER <10-5), a checksum for error detection is already sufficient, in which case a maximum proportion of useful data is obtained in this instance.

In the case of the hybrid ARQ method, by using the combination method, a receiving-end signal-to-noise ratio SNR is improved to such an extent that an error free reception is made possible. However, a disadvantage of the hybrid ARQ method can be seen in the fact that, by repeatedly transmitting entire data blocks, only a rough grading of the data rate and, as a result, only a rough adaptation to the properties of the radio transmission channel is made possible. large memory capacities must be provided at the receiving end to buffer errored data blocks. Re-requesting and transmitting errored data blocks leads to delays in the data stream or an effective useful data throughput is reduced.

For data transmissions in a communication system, especially in a radio communication system, so-called automatic repeat request transmission methods (ARQ transmission methods) or hybrid ARQ transmission methods are known in which an input data stream with serially successive data is transmitted by radio and divided into data blocks. In this case, each individual data block to be transmitted has a test data sequence added as a prefix which at the receiving end allows information to be provided about whether or not a data block was transmitted without errors. This test data sequence can be embodied, for example, as a checksum covering the data block or as a CRC data sequence for a cyclic redundancy check.

SUMMARY OF THE INVENTION

Therefore, it is an object of this invention to develop a method for the transmission of data in which, on the one hand, the memory capacity is reduced at the receiving end and, on the other hand, the effective useful data throughput is increased.

With this invention, an input data stream that has serially successive bits or symbols is divided into individual words. The individual words are mapped onto code symbols or modulation symbols during a later transmission, in which case each individual word includes one or more bits.

From the individual words of the input data stream, a specific transmittal data block is formed for (radio) transmission. For each position that a word may occupy within the transmittal data block, an a-priori reliability value can be determined which is obtained from the properties of a coding method or a modulation method used at the transmission end. This a-priori reliability value describes an error probability to be expected when a corresponding word is transmitted to the relevant position. The individual words are allocated to the individual positions within the transmittal data block on the basis of the a-priori reliability values of the relevant positions.

A word that is to be transmitted first is allocated to a first position with a maximum a-priori reliability value in the transmittal data block. A word to be transmitted second is allocated to a second position with a second highest a-priori reliability value or the word to be transmitted last is allocated to a last position in the transmittal data block with a minimum a-priori reliability value.

In the transmittal data block, the words of the input data stream to be transmitted are allocated ascending positions with descending a-priori reliability values.

An a-posteriori reliability value is formed at the receiving end for each received word of the transmittal data block and serves as the parameter for the error probability of the word and is compared with a pre-determined minimum value. For example, the receiving-end a-posteriori reliability value is formed by a soft output decoding such as trellis decoding. With this decoding, soft output information is used in order to determine an a-posteriori probability for each individual word and to determine whether or not the word was received correctly or with errors (for example, soft output Viterbi algorithm according to Hagenauer).

At the receiving end, if the a-posteriori reliability value of an ith word in an allocated ith position of the transmittal data stream falls below the minimum value, the ith word will then be considered as an error and at the transmission end a re-transmission of those words will be requested and executed; the words having a lower a-priori reliability value than the ith word and, as a result, occupying positions POS i in the transmittal data stream. In this case, the request is carried out effectively and simply by acknowledgement of the corresponding ith position of the word detected as having errors from the receiving end to the transmitting end.

At the transmission end, the acknowledgement of the ith position is interpreted in such a way that the first i-1 words of the transmittal data block with the positions 1 to i-1 were received error free, in which case their re-transmission is unnecessary. On the other hand, those words that were transmitted to the positions POS i will then be considered as errored, re-requested at the transmission end and re-transmitted by using a newly formed transmittal data block. In the case of the newly formed transmittal data block, the ith word of the previously transmitted transmittal data block is now assigned to the first position.

Unlike the hybrid ARQ method, if a transmission error occurs at the transmission end, complete transmittal data blocks are not re-requested and re-transmitted, but only those words that do not conform to a minimum value pre-determined at the receiving end are re-requested at the transmission end.

A method according to the invention saves memory capacity at the receiving end.

The inventive localization of errored words within a data block and their exclusive re-transmission increases the effective useful data throughput.

Acknowledging the first position means that only minimum additional signaling effort is needed for a reverse channel.

A method according to the invention can be used for different (radio) transmission methods or (radio) communication systems. It is particularly applicable to mobile radio communication systems because of its time-selective radio channel properties. This inventive method allows data transmission rates to always be optimized to the properties of the transmission channel.

A method according to the invention combines the errored words as a coherent group on the basis of their reliability value in the data block and enables them to be addressed according by their positions or called up as an entire group.

BRIEF DESCRIPTION OF THE DRAWINGS

These and other objects and advantages of the present invention are explained in greater detail below in the following description of the preferred embodiments, taken in conjunction with the accompanying drawings of which:

FIG. 5 is a data content diagram for a typical application of the method according to one aspect of the invention for the transmission of data in the case of a 16QAM modulation method used at the transmission end.

DETAILED DESCRIPTION OF THE PREFERRED EMBODIMENT

Figure 1:
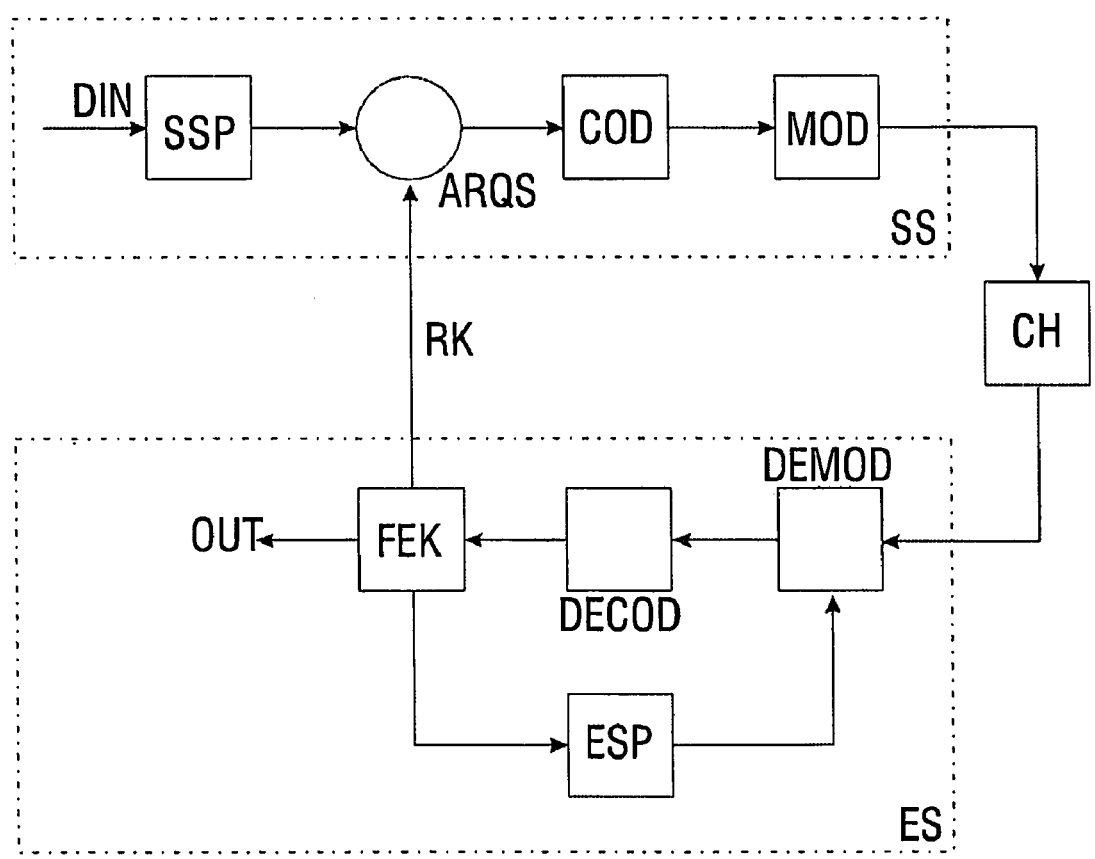
FIG. 1 is a block diagram of an arrangement for a known method for the transmission of data.

Reference will now be made in detail to the preferred embodiments of the present invention, examples of which are illustrated in the accompanying drawings, wherein like reference numerals refer to like elements throughout.

FIG. 1 shows a block diagram of an arrangement for a known method for the transmission of data. In the hybrid ARQ method ("Automatic Repeat Request", ARQ) shown here, transmission-end (SS) input data combined into DIN data blocks arrives at a device for ARQ control, ARQS, via a transmittal memory SSP that serves to buffer the data blocks. The DIN data blocks are coded by a coding device COD and are, in each case, provided with a checksum for error detection, known as parity check bits. The data blocks are then modulated by a modulation device MOD and transmitted via a time-variant transmission channel CH.

At the receiving end (ES), the transmitted data blocks are demodulated by a demodulation device DEMOD, decoded by a decoding device DECOD and fed to a device for error detection FEK. The relevant checksum allocated to each data block is checked here. Should an error be determined in the allocated, transmitted data block, the corresponding data block is, on the one hand, buffered by a receive memory ESP and, on the other hand, re-requested via a reverse channel RK from the transmission end.

The requested data block is re-transmitted and combined with the receiving-end data block which is buffered. Typical methods used for this are a maximum ratio combining method or a code combining method. Error correction is executed on the result of the combining method that this is undertaken in the decoding device DECOD. Data blocks evaluated as error free arrive at an output OUT so that they can be processed further.

Figure 2:
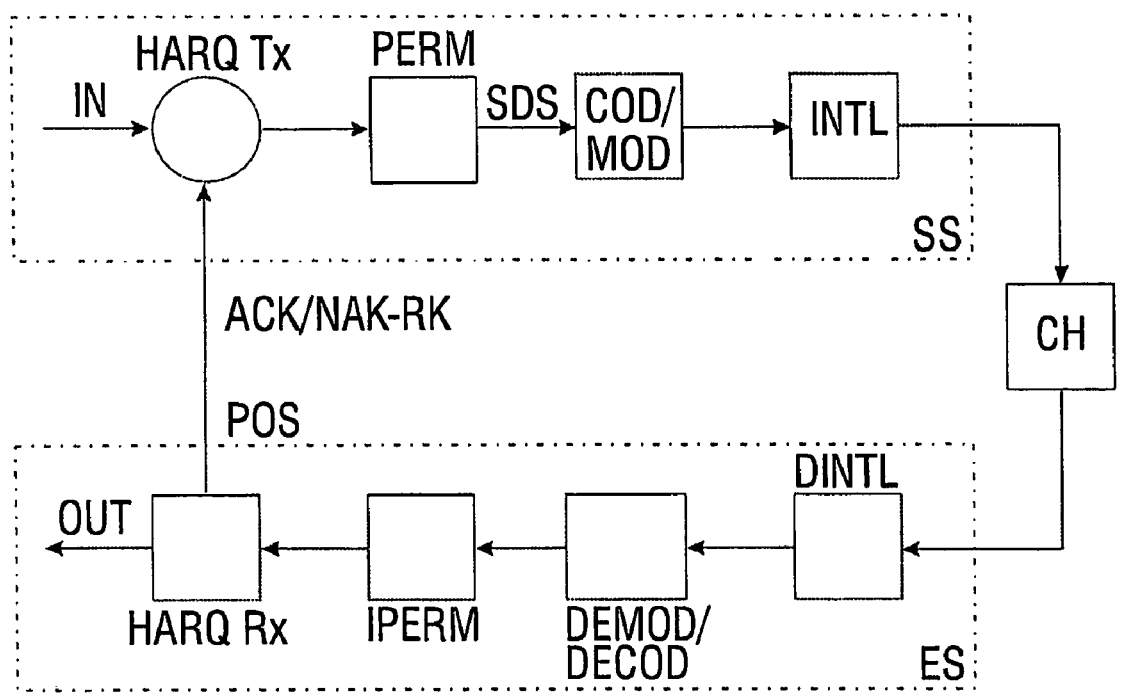
FIG. 2 is a block diagram of an arrangement for a method according to one aspect of the invention for the transmission of data.

FIG. 2 shows a block diagram of an arrangement for a method according to one aspect of the invention for the transmission of data in the case of an UMTS radio communication system.

An input data stream IN with serially successive bits or symbols is divided into words at the transmission end (SS) in a send control device HARQ-Tx which represents a high-speed downlink packet access. Subsequently, as many words as can be accommodated in a transmittal data stream SDS are fed to a permutation device PERM.

In the permutation device PERM, a specific transmittal data block SDS is formed from the individual words of the input data stream IN intended for (radio) transmission. For each position that a word may occupy within the transmittal data block SDS, an a-priori reliability value can be determined that depends on a coding method or a modulation method used at the transmission end. As a result, this a-priori reliability value describes an error probability to be expected on the transmission of a corresponding word to the relevant position. Therefore, the individual words are allocated to the individual positions within the transmittal data block on the basis of the a-priori reliability values of the relevant positions by using the permutation device PERM.

A word to be transmitted first is allocated to a first position with a maximum a-priori reliability value in the transmittal data block SDS. A second position with a second highest a-priori reliability value, etc. is allocated to a word to be transmitted in second. The word to be transmitted last is allocated to a last position in the transmittal data block SDS.

The transmittal data block SDS with the words arranged according to one aspect of the invention arrives at the radio communication system via a device for coding and modulating COD/MOD at an interleaving device INTL for carrying out an interleaving method. Data blocks formed in this way are radio-transmitted via a time-variant transmission channel CH which exhibits specific radio channel properties.

At the receiving end, the radio-transmitted data blocks are fed to a deinterleaving device DINTL for carrying out a deinterleaving method and are again demodulated or decoded by using a device for demodulating and decoding DEMOD/DECOD in which case the transmittal data block is recovered again at the receiving end. In this case a-posteriori reliability values serving as parameters for the error probability of the words recovered at the receiving end are obtained. For example, the receiving-end a-posteriori reliability values are formed by using a trellis decoding or by using another soft output decoding.

By using an inverse permutation device IPERM, the received words are rearranged in such a way that their sequence does not conform to the original input data stream IN.

Subsequently, the a-posteriori reliability value formed for each received word is compared with a pre-determined minimum value.

An ith word will be considered as errored if its a-posteriori reliability value falls below the minimum value. Therefore, via a receive control device HARQ-Rx, the ith position allocated to the ith word is reported to the transmission end SS by using a reverse channel ACK/NAK-RK. In this case, at the transmission end, a new transmittal data block is formed and the ith word is now allocated to the first position of the block, this word being considered to be errored at the receiving end. Further positions of the newly formed transmittal data block are occupied accordingly with the words i+1 and so forth of the previously transmitted transmittal data block; the words likewise being considered to be "transmitted incorrectly" according to the method.

The resulting allocation of words to positions on the basis of the reliability values is known both at the transmission end and at the receiving end.

Figure 3:
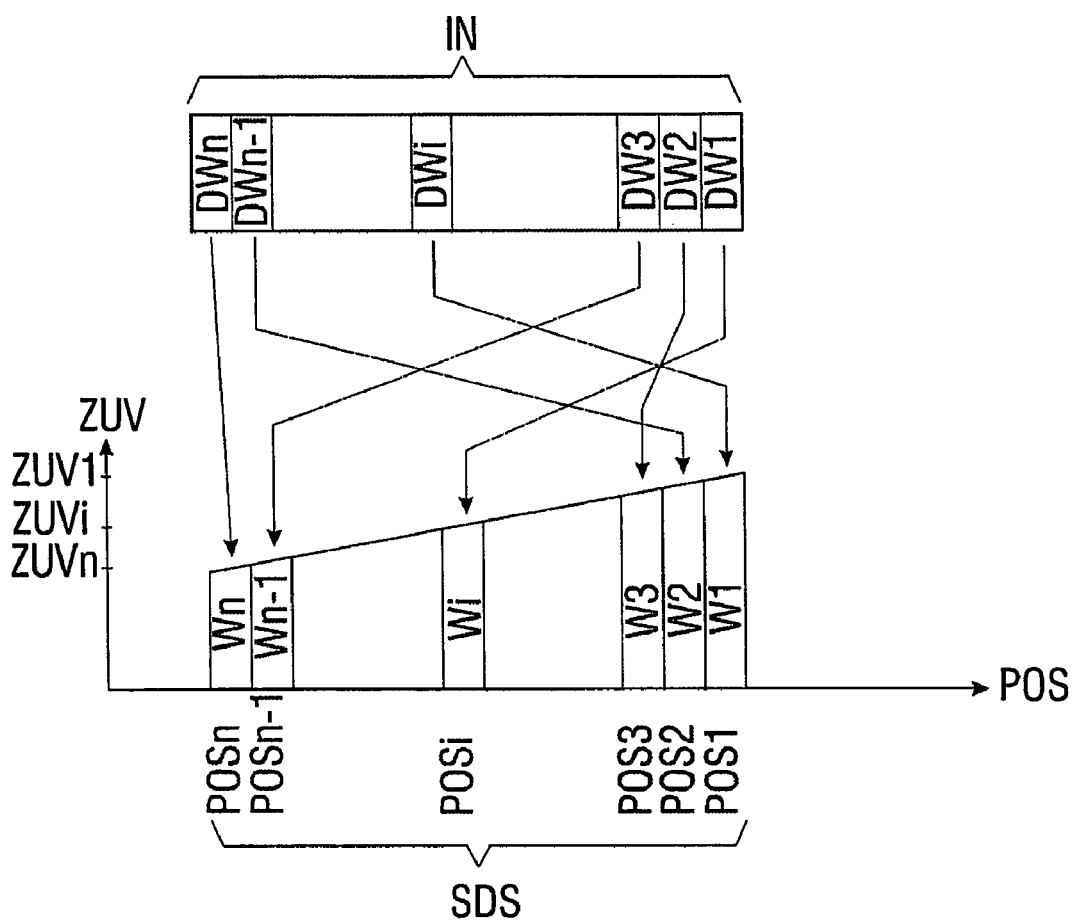
FIG. 3 is a data format diagram of the formation of a transmittal data stream shown in FIG. 2.

FIG. 3 shows a formation of a transmittal data block SDS from an input data stream IN shown in FIG. 2. The input data stream IN has a total of n words DW1 to DWn.

In order to form the transmittal data block SDS, the individual words DW1 to DWn of the input data stream IN are allocated to the positions POS of the transmittal data block SDS on the basis of the a-priori reliability values.

For each position POS that a word may occupy within the transmittal data block SDS, the a-priori reliability value ZUV1 to ZUVn can be determined, depending on a coding method or a modulation method used at the transmission end.

An ith word DWi of the input data stream IN is allocated to a first position POS1 of the transmittal data block SDS with a maximum reliability value ZUV1 and forms a first word W1 of the transmittal data block SDS. An nth word DWn is allocated to an nth position POSn of the transmittal data block SDS with a minimum reliability value ZUVn and forms an nth word Wn of the transmittal data block SDS, etc.

On transmitting the transmittal data block SDS, the first word WI at position POS1 is first of all transmitted. As a result, a transmittal data block SDS to be transmitted is obtained to which the words W1 to Wn are allocated to the ascending positions POS1 to POSn with descending reliability values ZUV1 to ZUVn in each case.

For a further improvement of the intended transmission, checksums and receiving-end combination methods can also be used. Using the method according to one aspect of the invention, it is in this case still possible to locate an error within a transmittal data block while a maximum amount of useful data is also allowed at the same time.

Figure 4:
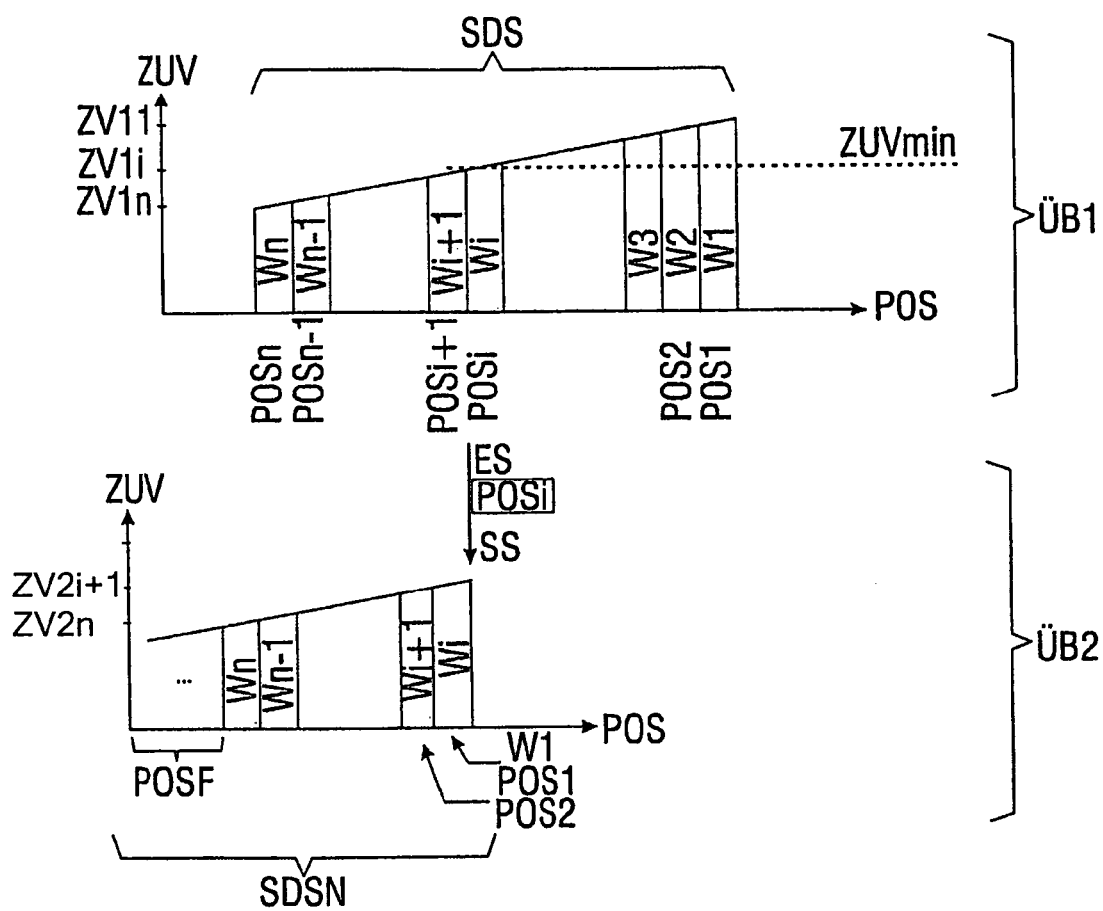
FIG. 4 is a data format diagram of a receiving-end evaluation of the transmittal data stream shown in FIG. 3.

FIG. 4 shows a receiving-end evaluation of the transmittal data block SDS shown in FIG. 3.

At the receiving end, an a-posteriori reliability value ZV11 to ZV1$n$ that serves as the specific parameter for the error probability of the word W1 to Wn is determined for each individual word W1 to Wn of the transmittal data block of a first transmission ÜB1.

For the first word W1 at the first position POS1, a maximum a-posteriori reliability value ZV11 is determined, whereas for the nth word Wn at the nth position POSn, a minimum reliability value ZV1$n$ is determined.

Unlike the example shown in this case, the a-posteriori reliability values are do not strictly decrease monotonically because they are dependent on random faults in the radio channel.

An ith word Wi at an ith position POSi has a reliability value ZV1$i$ falling below a pre-determined minimum value ZUVmin for the first time. The ith word Wi will then be considered as errored and the position POSi is reported back to the transmission end SS.

For a new transmission ÜB2, a new transmittal data block SDSN is formed. In this case, the word Wi of the first transmission ÜB1 is allocated to the first position POS1 of this new transmittal data block SDSN. Classified according to the method described here, the words Wi+1 to Wn follow the corresponding subsequent POS2, etc. Free positions POSF of the newly formed transmittal data block SDSN are filled with new words from the input data stream IN.

As a result, at the transmission end all the words Wi to Wn that occupied the positions POSi to POSn during the first transmission ÜB1 are re-transmitted on request.

If in the case of the first transmission ÜB1 for a receiving-end ith word Wi, it is assumed that its error probability was too high, the error probability in the case of the words Wi+1 to Wn transmitted further would still be higher and, therefore, a re-transmission ÜB2 of the words Wi to Wn would be practical.

The words W1 to Wn of the first transmission ÜB1 and the words Wi to Wn of the second transmission ÜB2 are fed to an error correction.

While the ith word Wi of the first transmission ÜB1 in the case of the second transmission ÜB2 now occupies the first position of the transmittal data block SDSN, the method according to the one aspect of invention implements an incremental redundancy combining method because the coding of the words contained in the transmittal data block SDSN to be transmitted is changed determined by the system. As a result, an additional redundancy method on transmitting is implemented by using simple means.

FIG. 5 shows an application of the method according to one aspect of the invention for the transmission of data in a 16QAM modulation method used at the transmission end.

In the case of the 16QAM modulation method shown and selected here for the intended radio transmission, amplitude values AP11 to AP44 which can be addressed by 4 bits each, are allocated to the 16 possible points X in each case.

In this case, the bits a1 to a4 of the amplitude values AP11 to AP14 of a first quadrant Q1 are selected in such a way that their first bit is a1=0 and their third bit is a3=0. Therefore, the following is obtained for the four possible amplitude values AP11 to AP14 of the first quadrant Q1: 0x0x.

Accordingly, they are as follows:

for the four amplitude values AP21 to AP24 of the second quadrant Q2: 0x1x, for the four amplitude values AP31 to AP34 of the third quadrant Q3: 1x0x, and for the four amplitude values AP41 to AP44 of the fourth quadrant Q4: 1x1x.

Interferences of the amplitude values AP11 to AP14 of the first quadrant Q1 which would, for example, result in the incorrect receiving of the amplitude values AP21 to AP24 of the second quadrants Q2, are unlikely because of their size for which reason the relevant first and third bits a1 and a3 of a considered amplitude value can be assumed to be more secure than the second and fourth bits a2 and a4 of the same amplitude value.

If each individual bit is seen as a word then the first and third words of a sequence of amplitude values have a high reliability value.

This will be explained below using an example. The following input data sequence IN consists of 8 bits or words:

$$IN = (s1, s2, s3, s4, s5, s6, s7, s8)$$
$$= (1, 1, 1, 1, 0, 0, 0, 0)$$

At the transmission end, the following allocation is made between words (bits) and positions of the transmittal data stream SDS on the basis of the reliability values:

| Mth bit in input data stream IN | Position in SDS |
| --- | --- |
| 1 | PS11 |
| 2 | PS21 |
| 3 | PS13 |
| 4 | PS23 |
| 5 | PS12 |
| 6 | PS22 |
| 7 | PS14 |
| 8 | PS24 |

With SS1=(PS11,PS12,PS13,PS14)=(s1,s5,s3,s7) and with SS2=(PS21,PS22,PS23,PS24)=(s2,s6,s4,s8)

produces a transmittal data block SDS with bits allocated according to the positions:

SDS=(SS1, SS2)=(1, 0, 1, 0, 1, 0, 1, 0), with SS1=(1, 0, 1, 0) and SS2=(1, 0, 1, 0).

A checksum PSS (Parity Check) is generated for the transmittal data block SDS, according to the following prescribed method:

PSS=(PS11⊕PS21, PS12⊕PS22, PS13⊕PS23, PS14⊕PS24)

PSS=(0, 0, 0, 0)

with ⊕ as the binary addition of the bits at the corresponding positions PS.

The checksum PSS is added as a prefix to the transmittal data block SDS and transmitted. This results in the following:

$$SDS(Tx) = (PSS, SS1, SS2)$$
$$= (0, 0, 0, 0, 1, 0, 1, 0, 1, 0, 1, 0).$$

Expressed in amplitude values, the following applies to the transmitted transmittal data block SDS(Tx):

SDS(Tx)=(AP11, AP44, AP44)

Below, it is assumed that at the receiving end, a transmittal data block SDSE was received:

$$SDSE = (PSE, RE1, RE2) \text{ with:}$$
$$PSE = AP11 \qquad = (0, 0, 0, 0)$$
$$RE1 = AP44 = (PR11, PR12, PR13, PR14) \quad = (1, 0, 1, 0)$$
$$RE2 = AP43 = (PR21, PR22, PR23, PR24) \quad = (1, 0, 1, 1)$$

In this, the bit or the word PR24 is errored.

At the receiving end, a checksum PSC is now also formed according to the following prescribed method:

PSC=(PR1⊕1PR21, PR12⊕PR22, PR1⊕3PR23, PR⊕14PR24)=(0,0,0,1)

The checksum comparison PSE PSC shows an error within the received transmittal data block SDSE, however, a decision cannot be reached whether or not the bit is errored at position PR14 or at position PR24.

The bit sequence (RE1, RE2) must now be taken into consideration.

On the basis of the following allocation table, the positions of unreliable bits are determined while the allocation carried out at the transmission end is canceled:

| Position in the bit sequence (RE1, RE2) | ith position in a newly formed bit sequence ERG |
| --- | --- |
| PR11 | 1 |
| PR21 | 2 |
| PR13 | 3 |
| PR23 | 4 |
| PR12 | 5 |
| PR22 | 6 |
| PR14 | 7 |
| PR24 | 8 |

After the allocation has been canceled, a newly formed bit sequence ERG is obtained which is as follows:

ERG=(1, 1, 1, 1, 0, 0, 0, 1)=(r1,r2,r3,r4,r5,r6,r7,r8)

Assuming that because of the error detected in the case of the checksum comparison, the a-posteriori reliability values of the positions PR14 and PR24 fall below the minimum value, the words r7 and r8 (that are accordingly allocated and considered to be errored) of the bit sequence ERG are re-requested at the transmission end.

The seventh position is transmitted with the i=7 position to the transmission end. In this way, the transmission-end words s1 to s6 were transmitted error-free and the words s7 and s8 are re-requested.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for the transmission of data,
   dividing a transmission-end input data stream into individual words;
   determining a-priori reliability values for positions of a transmittal data block based on transmission-end modulation methods and coding methods;
   allocating the words of the input data stream and transmitting in corresponding positions of the transmittal data block based on the a-priori reliability values;
   forming, at a receiving end, an a-posteriori reliability value for each word of the transmittal data block; and
   re-requesting received words having a minimum value falling below the a-posteriori reliability value, and re-transmitting from the transmission end.

2. A method according to claim 1,
   wherein a first word of the input data stream, allocated to a first position of the transmittal data block with a maximum a-priori reliability value, is transmitted first, and
   wherein an nth word of the input data stream, allocated to an nth position of the transmittal data block with a minimum a-priori reliability value, is transmitted last.

3. A method according to claim 2,
   wherein said forming at the receiving end includes determining an ith word at an ith position in the transmittal data block having an a-posteriori reliability value below the minimum value for the first time, and
   wherein said re-requesting includes transmitting the ith position of the ith word to the transmission end.

4. A method according to claim 3, wherein said re-transmitting includes forming at the transmission end a new transmittal data block in which the ith word of the transmittal data block transmitted previously is allocated to the first position for re-transmission and positions following the first position are occupied with following words of the transmittal data block transmitted previously that occupied positions greater than the ith position.

5. A method according to claim 4, wherein said re-requesting uses a return channel to transmit the ith position from the receiving end to the transmission end.

6. A method according to claim 5, further comprising:
   storing error words of a first transmission considered to be in error at the receiving end; and
   combining the error words with re-transmitted words of a second transmission by using one of a maximum ratio combining method and a code combining method.

7. A method according to claim 6, wherein said forming of the a-posteriori reliability values at the receiving end uses a soft output decoding method.

8. A method according to claim 7, wherein said forming of the a-posteriori reliability values at the receiving end uses a trellis decoding method.

9. A method according to claim 8, wherein said transmitting of the transmittal data block is a modulated transmission using one of a PSK, a 16QAM and a higher-level modulation method.

10. A method according to claim 9, further comprising adding one of a checksum and a CRC data block as a prefix to the transmittal data block for error detection.

* * * * *